(12) United States Patent
Hayman

(10) Patent No.: US 10,099,761 B2
(45) Date of Patent: Oct. 16, 2018

(54) WATER TURBINE PROPELLER

(71) Applicant: Richard Hayman, New York, NY (US)

(72) Inventor: Richard Hayman, New York, NY (US)

( * ) Notice: Subject to any disclaimer, the term of this patent is extended or adjusted under 35 U.S.C. 154(b) by 705 days.

(21) Appl. No.: 14/100,675

(22) Filed: Dec. 9, 2013

(65) Prior Publication Data
US 2014/0161615 A1 Jun. 12, 2014

Related U.S. Application Data

(60) Provisional application No. 61/734,410, filed on Dec. 7, 2012.

(51) Int. Cl.
*B63H 1/12* (2006.01)
*B63H 1/14* (2006.01)
*B63H 1/26* (2006.01)
*F04D 3/02* (2006.01)

(52) U.S. Cl.
CPC ............ *B63H 1/12* (2013.01); *B63H 1/14* (2013.01); *B63H 1/26* (2013.01); *B63H 2001/125* (2013.01); *F04D 3/02* (2013.01); *Y02T 70/542* (2013.01)

(58) Field of Classification Search
CPC .... F04D 3/00; F04D 3/02; B63H 1/12; B63H 1/14; B63H 1/26; B63H 2001/122; B63H 2001/125; B63H 2001/127
See application file for complete search history.

(56) References Cited

U.S. PATENT DOCUMENTS

| | | | | |
|---|---|---|---|---|
| 2,106,928 A * | 2/1938 | Lee | ............ | B64C 11/005 415/72 |
| 3,011,561 A * | 12/1961 | Wagener | ........... | B63H 1/16 415/126 |
| 3,087,435 A * | 4/1963 | Boucher | ........... | F04D 3/02 415/1 |
| 3,187,816 A * | 6/1965 | Winter | ........... | F03B 17/061 416/177 |
| 4,849,647 A | 7/1989 | McKenzie | | |
| 5,451,137 A | 9/1995 | Gorlov | | |

(Continued)

FOREIGN PATENT DOCUMENTS

| | | | | |
|---|---|---|---|---|
| DE | 102010022070 A1 * | 11/2011 | ............ | B63H 1/12 |
| GB | 1368095 A * | 9/1974 | ............ | F04D 3/02 |

OTHER PUBLICATIONS

Joe Stuart, "Corrosion Considerations When Designing with Exotic Metals and Advanced Composites", Paper 4B2, Corrosion Solutions Conference 2009—Proceedings, pp. 221-225.*

*Primary Examiner* — Justin Seabe
*Assistant Examiner* — Brian P Wolcott
(74) *Attorney, Agent, or Firm* — Gottlieb, Rackman & Reisman, PC

(57) ABSTRACT

A water turbine propeller includes an optional turbine casing having forward and rearward openings, a rotational cylindrical unit, a plurality of rotating foil blades rigidly secured to the inner periphery of the rotational shaft on a common shaft, and an engine or motor which rotates the rotational shaft within the turbine casing. The operation of the engine causes the rotation of the rotational shaft and the helical blades direct water into the forward opening of the turbine casing and out the rearward openings of the turbine casing, thereby creating a focused torque (or vortex) effect on the water flow for a propulsive force.

10 Claims, 8 Drawing Sheets

(56) References Cited

U.S. PATENT DOCUMENTS

| | | | |
|---|---|---|---|
| 5,722,864 A | 3/1998 | Andiarena | |
| 6,470,817 B2 | 10/2002 | Delfosse | |
| 7,132,760 B2 | 11/2006 | Becker | |
| 7,362,004 B2 | 4/2008 | Becker | |
| 7,902,687 B2 | 3/2011 | Sauer | |
| 8,061,993 B2 | 11/2011 | Sassow | |
| 8,096,750 B2 * | 1/2012 | McEntee | F03B 3/121 415/4.2 |

* cited by examiner

WATER TURBINE PROPELLER

RELATED APPLICATIONS

The present application claims priority to U.S. Provisional Application No. 61/734,410 filed on Dec. 7, 2012, the entire content of which is hereby incorporated by reference.

BACKGROUND OF THE INVENTION

1. Field of the Invention

The present invention relates to a marine propulsion system for a watercraft. More particularly, this invention involves a system of rotating foil blades forming a water turbine propeller which generates efficient propulsion at a low rate of revolution.

2. Description of the Related Art

The prior art, as is known to the inventor, consists of turbines, vessels, or marine propulsion system, which conduct water through conduits for propulsion, or actual turbine jets.

U.S. Pat. No. 5,451,137 teaches a reaction turbine and more specifically two unidirectional reaction turbines operable under reversible fluid flows for use with hydro-pneumatic, hydro, wind, or wave power systems. The hydro-pneumatic power systems are used for generating power from tidal or current motion of water. This invention provides a unidirectional reaction turbine capable of achieving high speeds needed for industrial electric generators under ultra-low head pressure fluid flow and/or flows of velocities of 5 feet per second or greater. Further, this invention has air-foil shaped blades connected to supporting members that are mounted on a rotatable shaft.

U.S. Pat. No. 5,722,864 teaches a marine propulsion system for watercraft. The system has propulsion blades internal to the housing of the system as opposed to externally, such as with a typical marine propeller.

U.S. Pat. No. 6,470,817 teaches additional improvements in small waterplane area multihull (SWAMH) vessels. The vessel includes an engine means that is situated on the upper hill platform and is joined to the rotary propulsive means which converts the output of the engine to the rotary motion to provide a propulsive force.

U.S. Pat. No. 7,902,687 teaches a submersible turbine-generator unit for ocean and tidal currents. More specifically, the submersible turbine-generator will create hydroelectric power, which is a source of renewable energy.

U.S. Pat. No. 8,061,993 teaches a vertical axis turbine for unidirectional rotation under multidirectional fluid flows for use with hydro-pneumatic, hydro, wind, or wave power systems. The vertical axis turbine is particularly suited for fluid flows that will naturally change direction while remaining parallel to the surface from which the rotating shaft of the vertical axis turbine extends. The turbine does not need to be placed in a channel for directing fluid flow in a specific direction across its blades.

SUMMARY OF THE INVENTION

Marine technology is always striving for improved efficiency. This demand has led to the development of various hydro propulsion systems. For example, a double propeller system including two propellers having oppositely oriented blades, connected in series, and spinning in opposite directions to transfer momentum better at higher speeds. However, the design has limited efficiency resulting in high fuel demand for short distance travel. Other systems may be more efficient in terms of fuel usage, but have other drawbacks such as being prone to wear and breakdown and are easily damaged due to grounding.

There is a need in the industry for a propulsion system that more efficiently moves a large vessel at low rotations per minute (rpm). In the present invention, the foil blades of the propulsion system create a focused torque (or vortex) effect on the water flow. The water turbine propeller is useful for low rpm engines in slow speed vessels.

The present invention relates to a water turbine propeller including an optional turbine casing having forward and rearward openings, a rotational cylindrical unit, a plurality of rotating foil blades rigidly secured to the inner periphery of the rotational shaft on a common shaft, an attachment clasp and an engine which rotates the rotational shaft within the turbine casing. The operation of the engine causes the rotation of the rotational shaft and the double helical blades direct water into the forward opening of the turbine casing and out the rearward openings of the turbine casing, thereby creating a focused torque (or vortex) effect on the water flow.

It is an object of the present invention to provide a water turbine propeller which maximizes thrust and provides fuel and energy efficiency while propelling the vessel.

The above and yet other objects and advantages of the present invention will become apparent from the hereinafter set forth Brief Description of the Drawings, Detailed Description of the Invention and Claims appended herewith.

BRIEF DESCRIPTION OF THE DRAWINGS

The foregoing aspects and other features of the present invention are explained in the following description, taken in connection with the accompanying drawings, wherein.

DETAILED DESCRIPTION OF THE INVENTION

Figure 1:
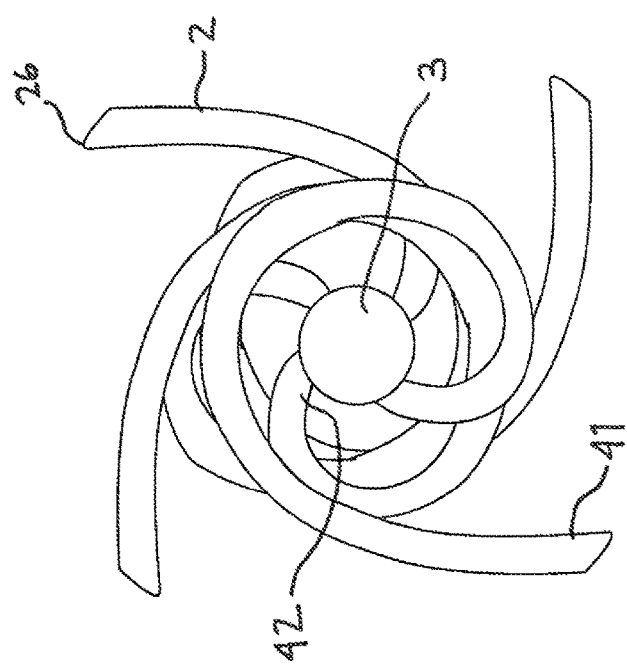
FIG. 1 is a front view of an example of a double helix turbine propeller apparatus of the present application.

Referring to FIGS. 1 through 7, there is shown a water turbine propeller apparatus 1 comprising an optional turbine casing 19, a plurality of foil blades 2, and a rotatable shaft 3 having a first mounting surface 51 and a second mounting surface 17. The plurality of foil blades 2 are fixed to the first mounting surface 51. Each foil blade 2 has a leading edge 41 and a trailing edge 42, wherein movement of each blade 2 through a liquid forces the liquid towards the central axis and away from the first mounting surface 51. The present invention further includes a motor 16 that is adapted to rotate the shaft 3 at the second mounting surface 17. Each foil blade 2 attached to the first mounting surface 51 extends outward from the rotatable shaft 3 and circumferentially around a central axis corresponding to the rotatable shaft 3.

The apparatus 1 is part of a hydro propulsion system that will be most effective at slower rotational speeds and for large vessel propulsion, especially low rpm diesel/electric engine applications. A moderate engine speed will be matched by effective propulsion at a lower relative rpm than existing screw propeller systems. The foil blades 2 create lift compression and direct water inward. In an alternative embodiment, water W flows through the cylindrical turbine casing 19 where the helical foil blades 2 are housed, increasing the propulsive pressure into forward inertial energy.

Any suitable drive that can rotate the cylindrical turbine casing 19 may be used. For example, engine power could be delivered through a chain or shaft attachment 5 or by utilizing the cylindrical turbine casing 19 as an electric rotor with bearings. The foil blades 2 provide an efficient drive mechanism at water W contact. The efficiency may be enhanced by channeling chaotic propulsion patterns occurring in the turbine casing 19 into a steady flow thrust.

Figure 2:
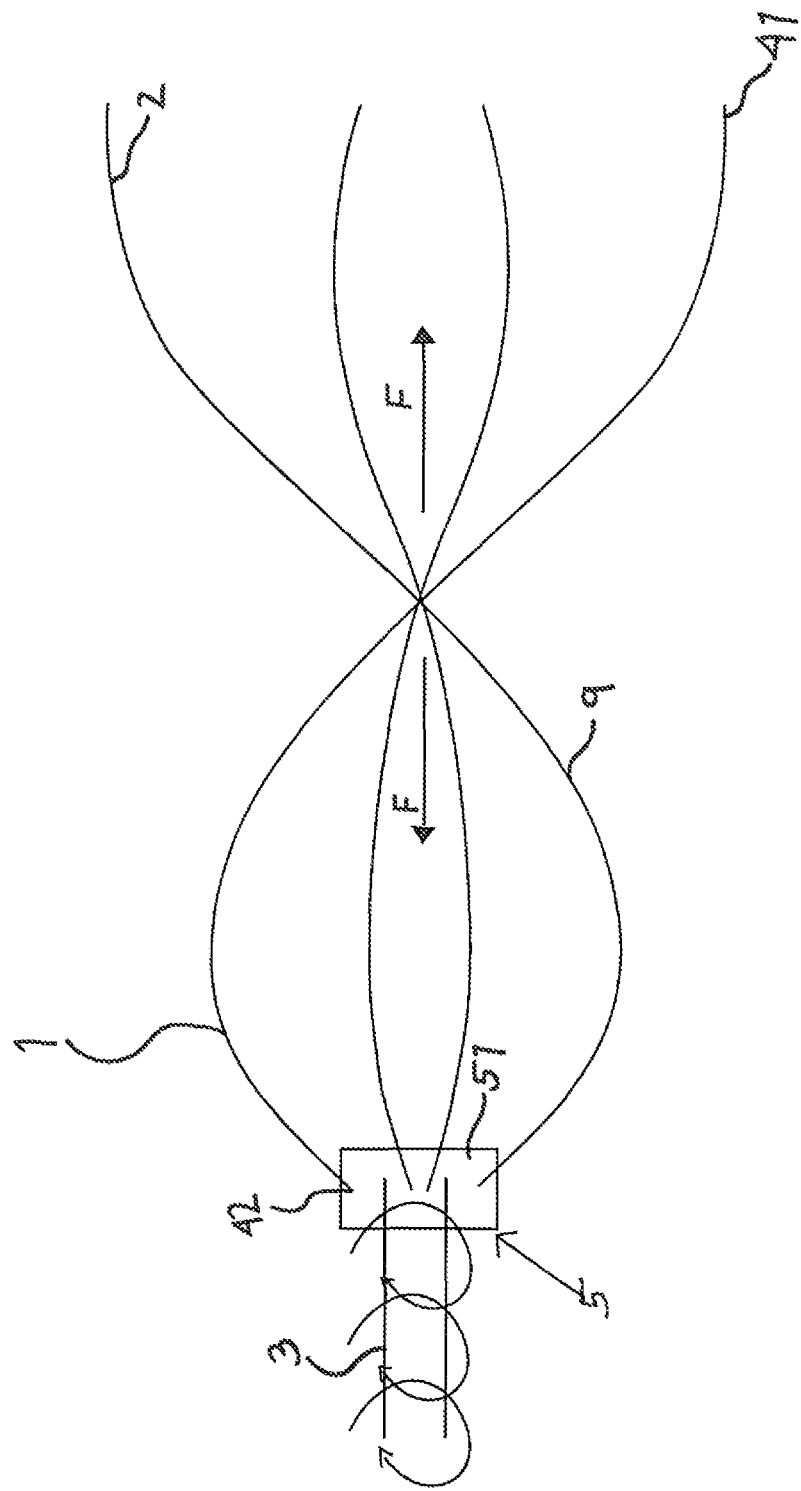
FIG. 2 is a side view thereof.
Figure 3:
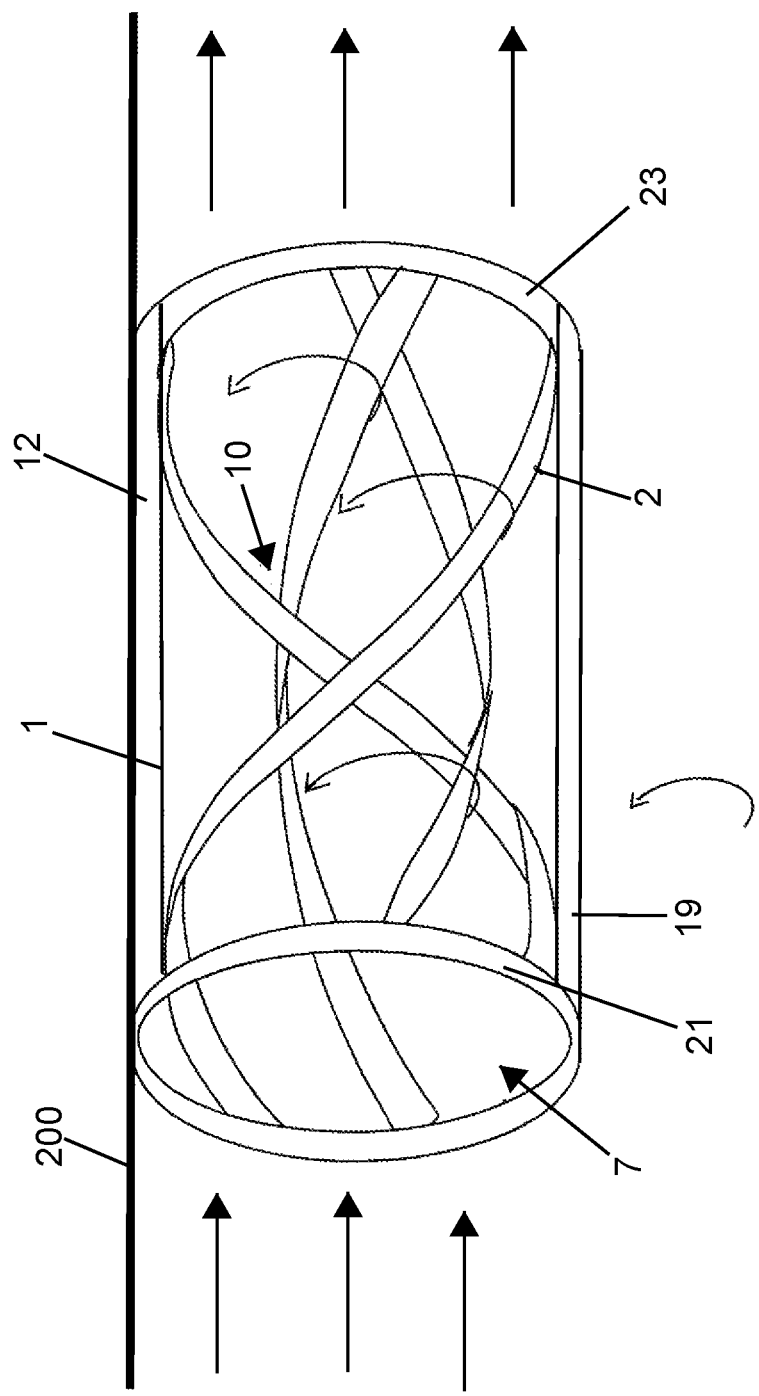
FIG. 3 is a side perspective view of a cylindrical turbine propeller apparatus of the present invention.

As seen in FIGS. 1 through 3, the turbine casing 19 has a rotation shaft 3, which is rotably secured within the turbine casing 19. By example, the rotation shaft 3 may be a cylinder or a cone rigidly having a plurality of foil blades 2 attached to the inner periphery 7 of the turbine casing 19. Each foil blade 2 is connected to a distal attachment member and to a proximate attachment member. The foil blades 2 may be in a helix 9 or double helix 10 formation as seen in FIGS. 1 through 5. The ends of the foil blades 2 are angled creating a sharp pointed tip 26. Further, as seen in FIG. 3, an air cushion 12 or sealed oil bearing system lies parallel to the rotating cylindrical turbine casing 19, which lessens friction between the hull 200 and the water turbine propeller system 1. In addition, a thin outer casement material may be employed to minimize water turbulence and resistance.

Figure 4:
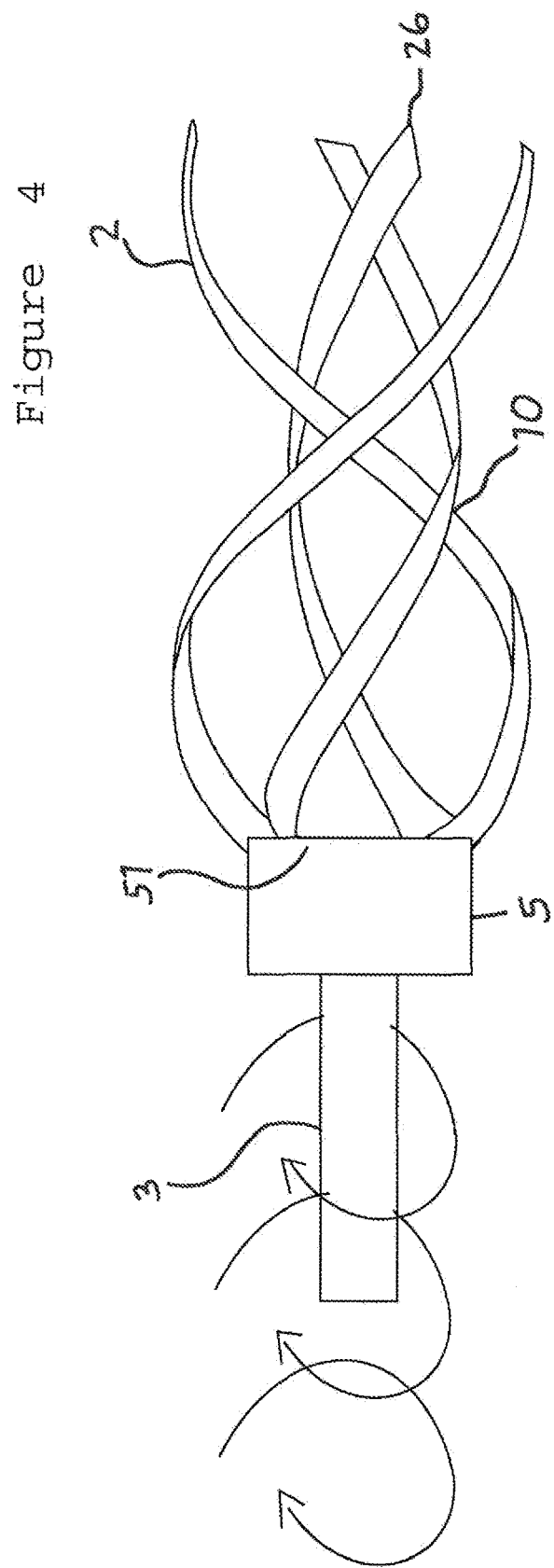
FIG. 4 is a cross sectional view of an example of a water turbine propeller system.
Figure 5:
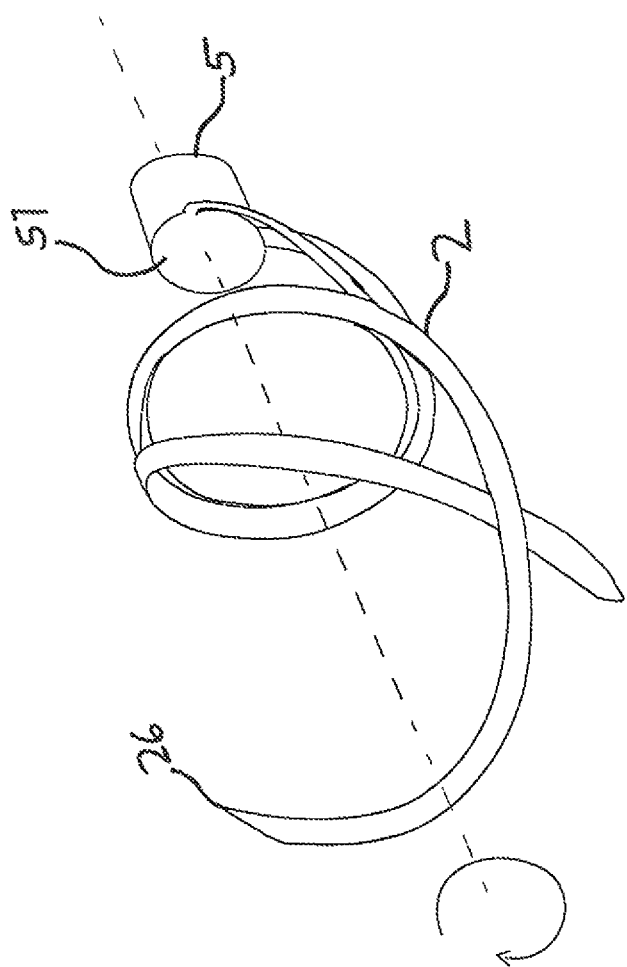
FIG. 5 is a front perspective view of an example of a water turbine propeller system of the present invention.

As illustrated in FIGS. 2 through 4, the foil blades 2 curve around a center axis, which evenly distributes the foil sections throughout the rotation cycle resulting in the presence of a foil section at many angles. As shown in FIG. 3, the turbine casing 19 can include cylindrical end pieces 21, 23 between which the foil blades 2 extend. The water W will enter the rotating cylindrical turbine casing 19 where the helical foil blades 2 are located. As seen in FIG. 3, the flowing water W is directed onto the foil blades 2, creating a force F on the blades 2. The motion of the blades 2 changes the speed and direction of the water W. While the cylindrical turbine casing 19 is spinning, the force F on the blades 2 acts through a distance. This results in energy transfer from the turbine to the water flow. The transferred energy will then generate propulsion at a low revolution rate. The positioning of the foil blades 2 allows for more or less energy transfer. Further, the double helix formation 10 gives an efficient transfer of torque and smooth motion.

Figure 6:
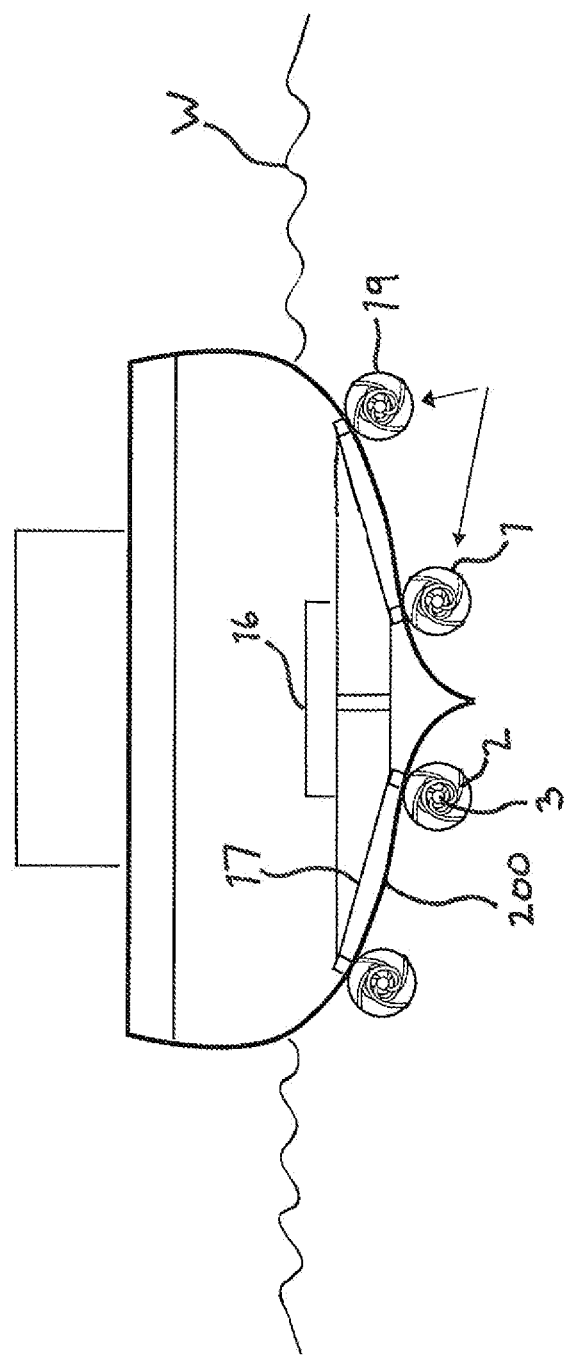
FIG. 6 is a rear view showing an example of a water turbine propellers of the present invention attached to a boat hull.
Figure 7:
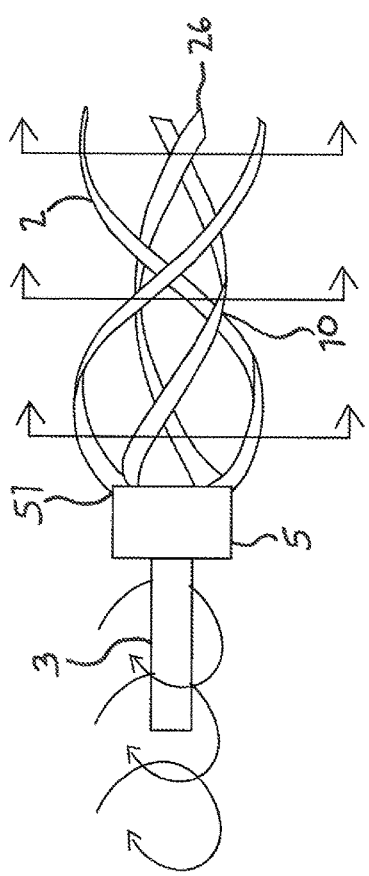
FIG. 7 is a side view of the double helix foil blades attached to the cylindrical rotational shaft.
Figure 8C:
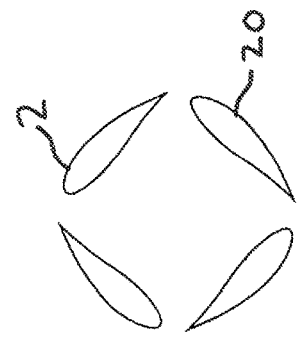
FIGS. 8A through 8C are cross sectional views of an example of foil blades of the present invention.
Figure 8B:
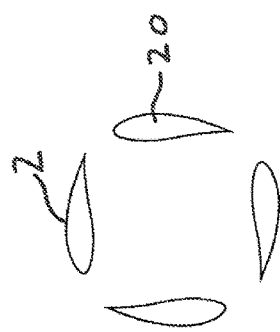
Figure 8A:
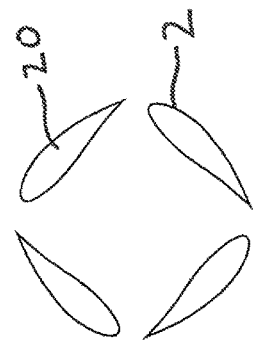

As best shown in Figures FIGS. 4 and 6, a foil blade 2 extends away from the central axis in a coiling manner, where the length of the blade 2 wraps around a central axis. The blade 2 extends radially outward and then wraps circumferentially around the central axis while extending away from the first mounting surface 51.

Figure 9:
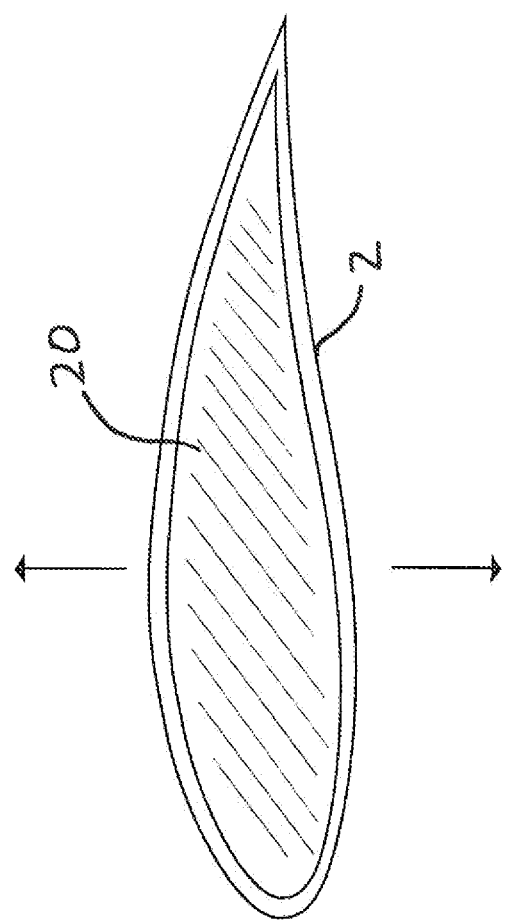
FIG. 9 is a side view of an example of a foil blade of the water turbine propeller system of the present invention.

As illustrated in FIG. 9, the foil blades 2 are shaped similarly to an aircraft wing in order to drive water W inward and out the rear of the turbine casing 19. The foil blades 2 have a shape that is angled so that pressure differences across the foil blades 2 create lift forces, like those on aircraft wings. The forces act on the fluid and push the fluid away from the first mounting surface 51, thereby propelling the system 1 forward. Additionally, the foil blades 2 may be manufactured as a composite combining carbon fiber with a coat of titanium 20. Properties of carbon fiber includes, but not limited to, high stiffness, high tensile strength, low weight, high chemical resistance, high temperature tolerance and low thermal expansion.

It should be understood that the foregoing description is only illustrative of the invention. Various alternatives and modifications can be devised by those skilled in the art without departing from the invention. Accordingly, the present invention is intended to embrace all such alternatives, modifications, and variances.

What is claimed is:

1. A water turbine propeller apparatus, comprising:
a shaftless housing including a first cylindrical end piece having a first opening extending therethrough and delimited by an inner surface and an outer surface that is spaced from the inner surface, a second cylindrical end piece that is spaced from the first cylindrical end piece and has a first opening extending therethrough and delimited by an inner surface and an outer surface that is spaced from the inner surface and a plurality of foil blades attached directly to and extending between the inner surface of the first cylindrical end piece and the inner surface of the second cylindrical end piece, each of said plurality of foil blades having a helical configuration and including a leading edge and a trailing edge with a first blade surface and a second blade surface extending between the leading edge and the trailing edge of each of the plurality of foil blades and each of the plurality of foil blades defining an open exterior portion of the shaftless housing between the first cylindrical end piece and the second cylindrical end piece.

2. The water turbine propeller apparatus of claim 1, wherein said plurality of foil blades are spaced substantially equal distances from each other.

3. The water turbine propeller apparatus of claim 1, wherein said plurality of foil blades includes four blades.

4. The water turbine propeller apparatus of claim 1, wherein said plurality of foil blades are angled forming a sharp-pointed tip.

5. The water turbine propeller apparatus of claim 1, wherein said plurality of foil blades include carbon fiber coated with titanium.

6. The water turbine propeller apparatus of claim 1, wherein said plurality of foil blades generate a motion vortex.

7. The water turbine propeller apparatus of claim 1, wherein said plurality of foil blades generate a drive mechanism at water contact.

8. The water turbine propeller apparatus of claim 1, wherein the shaftless housing and a hull of a vessel are positioned to allow an air cushion therebetween.

9. The water turbine propeller apparatus of claim 1, wherein said shaftless housing is positioned at a bottom of a vessel.

10. A turbine propeller apparatus, comprising:
a shaftless housing extending along an axis and including a first cylindrical end piece having a first opening extending therethrough and a second cylindrical end piece that is spaced from the first cylindrical end piece and has a second opening extending therethrough and a plurality of foil blades extending between and attached directly to the first cylindrical end piece and the second cylindrical end piece, the plurality of foil blades defining an open exterior portion of said shaftless housing between said first circumferential end piece and said second circumferential end piece.

* * * * *